(12) United States Patent
Hoefte

(10) Patent No.: US 10,488,240 B2
(45) Date of Patent: Nov. 26, 2019

(54) LIQUID DOSING APPARATUS

(71) Applicant: The Procter & Gamble Company, Cincinnati, OH (US)

(72) Inventor: Paulus Antonius Augustinus Hoefte, Astene (BE)

(73) Assignee: The Procter & Gamble Company, Cincinnati, OH (US)

( * ) Notice: Subject to any disclaimer, the term of this patent is extended or adjusted under 35 U.S.C. 154(b) by 114 days.

(21) Appl. No.: 15/791,450

(22) Filed: Oct. 24, 2017

(65) Prior Publication Data

US 2018/0113016 A1 Apr. 26, 2018

(30) Foreign Application Priority Data

Oct. 25, 2016 (EP) ..................... 16195522

(51) Int. Cl.
| | |
|---|---|
| *G01F 11/06* | (2006.01) |
| *B65D 47/30* | (2006.01) |
| *B65D 47/08* | (2006.01) |
| *B65D 47/20* | (2006.01) |
| *G01F 15/00* | (2006.01) |

(52) U.S. Cl.
CPC .......... *G01F 11/06* (2013.01); *B65D 47/0804* (2013.01); *B65D 47/2075* (2013.01); *B65D 47/30* (2013.01); *G01F 15/005* (2013.01)

(58) Field of Classification Search
CPC ........ G01F 11/06; G01F 11/082; G01F 11/22; G01F 11/263; G01F 11/265; G01F 11/286; B65D 47/0804; B65D 47/2075; B65D 47/30
See application file for complete search history.

(56) References Cited

U.S. PATENT DOCUMENTS

| | | |
|---|---|---|
| 2,730,270 A | 1/1956 | Heinemann |
| 3,424,355 A | 1/1969 | Blumen |
| 4,728,011 A | 3/1988 | Schuster et al. |
| 4,811,871 A | 3/1989 | Wass et al. |
| 4,946,080 A | 8/1990 | Vesborg |
| 5,129,561 A | 7/1992 | Drobish |
| 5,184,760 A | 2/1993 | Weinstein et al. |
| 5,602,091 A | 2/1997 | Monson et al. |
| 6,227,418 B1 | 5/2001 | Loertscher |
| 6,997,358 B2 | 2/2006 | Wass |
| 7,246,723 B2 | 7/2007 | Santagiuliana |
| 8,528,795 B2 | 9/2013 | Law et al. |
| 2006/0037977 A1 | 2/2006 | Eimer |
| 2008/0073383 A1 | 3/2008 | McDonald |

(Continued)

FOREIGN PATENT DOCUMENTS

| | | |
|---|---|---|
| DE | 2347092 A1 | 3/1975 |
| DE | 19500830 C1 | 4/1996 |

(Continued)

OTHER PUBLICATIONS

U.S. Appl. No. 15/791,453, filed Oct. 24, 2017, Hoefte.

(Continued)

*Primary Examiner* — Nicholas J. Weiss
(74) *Attorney, Agent, or Firm* — Gary J. Foose

(57) ABSTRACT

An apparatus and means of repeatedly dispensing controlled doses of liquid contained in a resiliently squeezable container, wherein the dose size can be adjusted.

16 Claims, 9 Drawing Sheets

(56) References Cited

U.S. PATENT DOCUMENTS

| | | |
|---|---|---|
| 2011/0198371 A1 | 8/2011 | Law et al. |
| 2012/0097714 A1* | 4/2012 | Hoefte .................... G01F 11/04 |
| | | 222/477 |
| 2013/0184677 A1 | 7/2013 | Py |
| 2013/0270301 A1 | 10/2013 | Schoubben et al. |

FOREIGN PATENT DOCUMENTS

| | | |
|---|---|---|
| DE | 202004014129 U1 | 12/2004 |
| EP | 0239358 A2 | 9/1987 |
| EP | 0274256 A1 | 7/1988 |
| EP | 0337778 A2 | 10/1989 |
| EP | 0446805 A1 | 9/1991 |
| EP | 2444782 A1 | 4/2012 |
| GB | 975288 A | 11/1964 |
| GB | 2201395 A | 9/1988 |
| WO | WO9110115 A1 | 7/1991 |
| WO | WO2005049477 A2 | 6/2005 |
| WO | WO2010023462 A1 | 3/2010 |

OTHER PUBLICATIONS

U.S. Appl. No. 15/791,455, filed Oct. 24, 2017, Hoefte.
Extended European Search Report; Application No. 16195534.9-1553; dated May 4, 2017; 9 pages.
International Search Report; International Application No. PCT/US2017/057810; dated Jan. 30, 2018; 14 pages.
International Search Report; International Application No. PCT/US2017/057812; dated Jan. 30, 2018; 15 pages.

\* cited by examiner

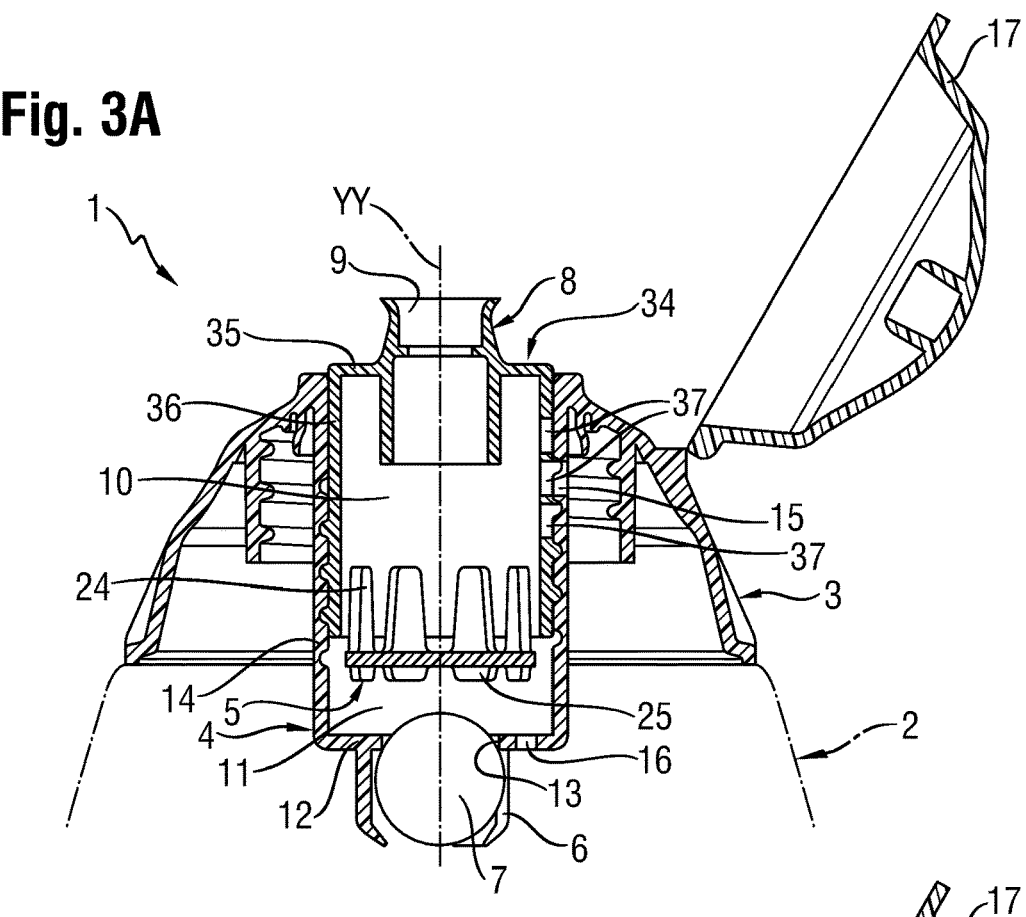
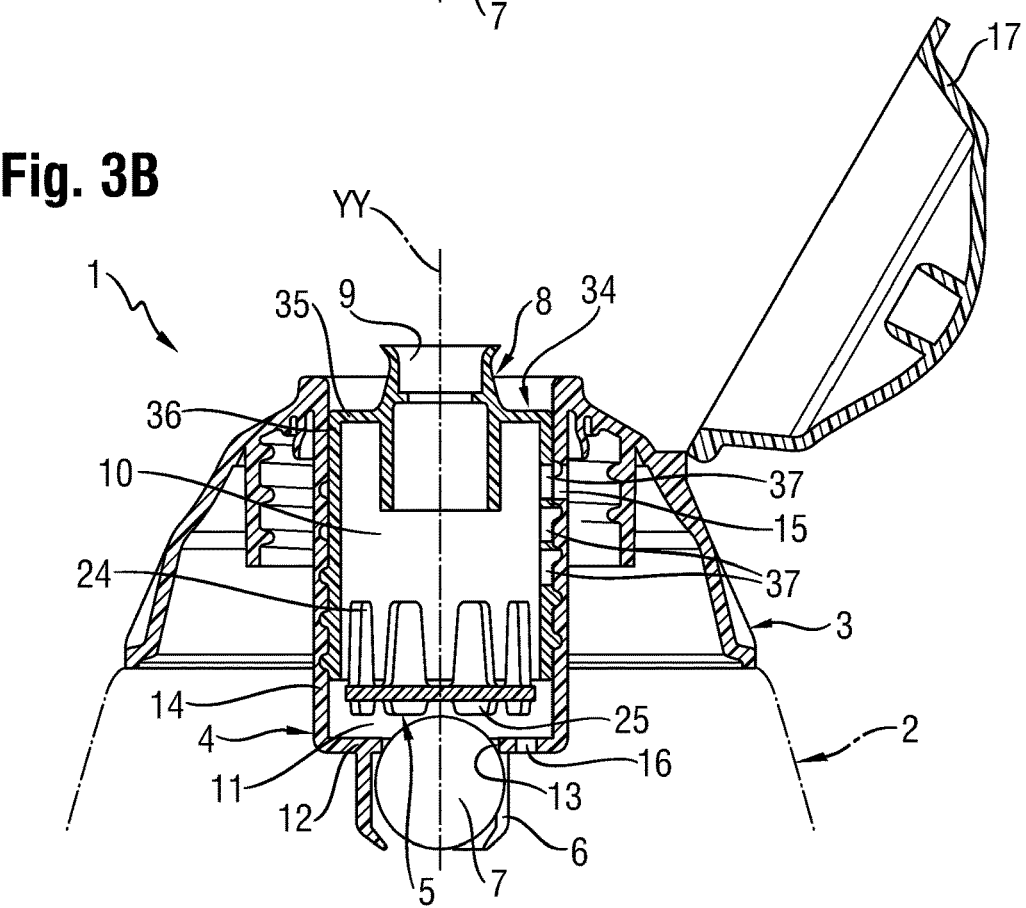

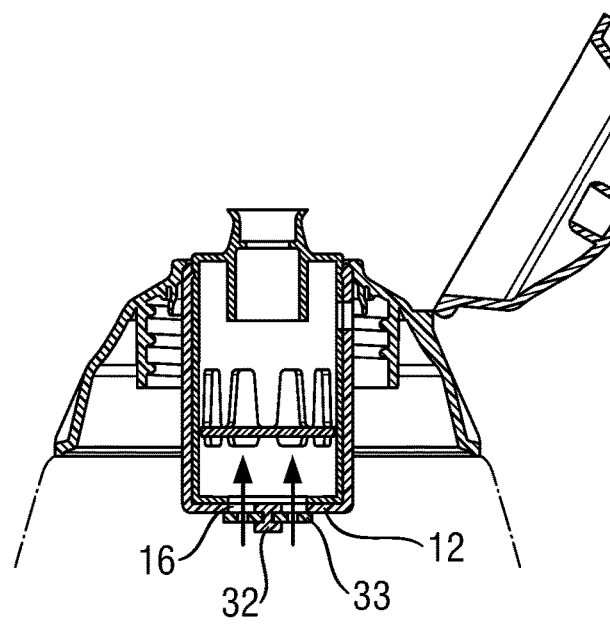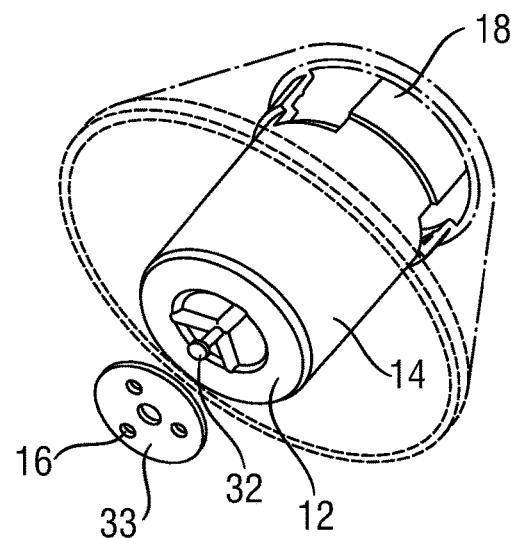
Fig. 10A  Fig. 10B
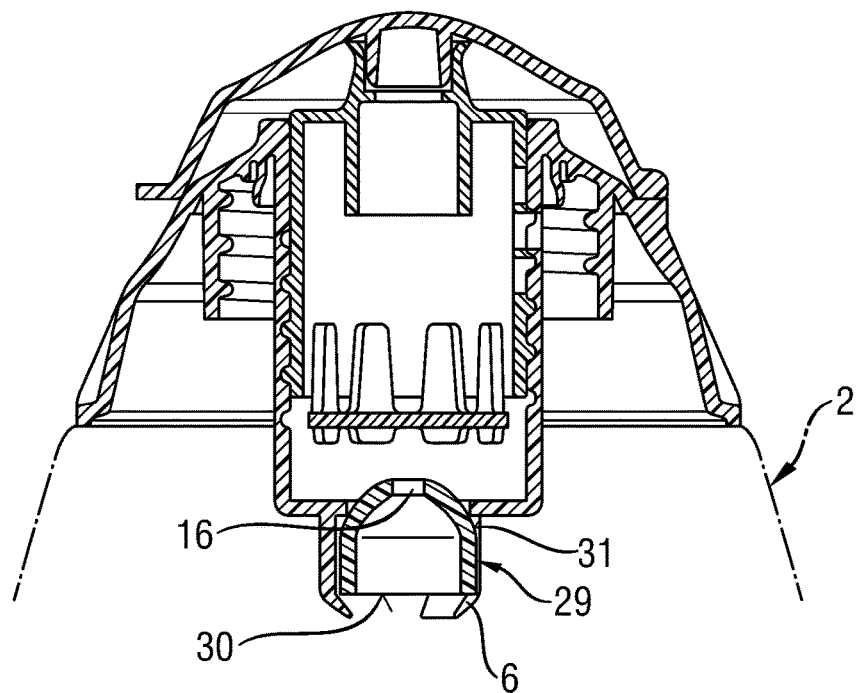
Fig. 11

LIQUID DOSING APPARATUS

FIELD OF INVENTION

The present invention relates to an apparatus and means of repeatedly dispensing controlled doses of liquid, while also varying the dosage volume.

BACKGROUND OF THE INVENTION

It may be desirable to deliver a precise dose of a liquid and be able to vary and select the volume of this dose for different applications and different needs. It may also be desirable to provide a dosage system that does not rely solely on gravity or needs a bulky volumetric dosing chamber or requires a complex and large pumping mechanism. It may be particular desirable to deliver said benefits by simply inverting and squeezing a container whilst offering a compact, low cost and simple constructions.

For example, a large dose is desired when dosing a hard surface cleaning composition into a bucket of water for the general cleaning of floors. However, a smaller dose is desired when directly applying the hard surface cleaning composition onto the surface for spot cleaning a stain. A large dose would also be desired for dosing a laundry liquid composition into a washing machine, while a smaller dose is desired for direct application onto a fabric stain.

EP2653842 relates to an apparatus and means of repeatedly dispensing controlled doses of liquid comprising a resiliently squeezable container for containing a liquid detergent composition; a cap operably connected to said container, the cap comprising a nozzle for expelling the liquid out of the container; a dosing chamber operably connected to the cap, wherein the dosing chamber comprises a base having a discharge opening therein, sidewalls extending upwardly along the perimeter of said base and at least one inlet opening located proximal the sidewalls; at least one timer aperture located proximal to the discharge opening; a plunger, provided in the dosing chamber and moveable relative to the chamber so as to advance upon squeezing of the container, up to a blocking position; a valve retaining means located below the base; a valve provided in the valve retaining mean wherein the valve is movable from an open position, allowing liquid flow through the discharge opening, and a closed position, where the valve blocks the discharge opening; wherein the liquid is a shear thinning liquid and the shear thinning liquid has a viscosity of greater than 150 mPa·s measured at 10 s$^{-1}$ at 20° C. EP2444782 relates to an apparatus and means of repeatedly dispensing controlled doses of liquid. WO 2005049477 A2 relates to liquid dosing devices of the kind in which flow to a front discharge opening of a container is blocked after a controlled delay by a sliding piston movable in a control chamber mounted in a container neck behind the discharge opening. Movement of the piston is governed by restricted flow through control openings at the back of the control chamber. Restoration of the piston after a dosing operation is assisted by providing a dump valve at the rear of the control chamber. For simplicity and ease of construction, as well as effective sealing operation, the dump valve member is a ball retained in a cage. Another proposal provides a one-way valve in the outlet path, obviating the dump valve and enabling rapid recovery after a dosing operation when used with a resiliently squeezable container.

SUMMARY OF THE INVENTION

A first aspect of the present invention relates to a dosing apparatus (1) for dispensing a dose of liquid comprising: a resiliently squeezable container (2); a cap (3) operably connected to said container (2); a dosing chamber (4) operably connected to said cap (3), wherein said dosing chamber (4) comprises a dosing chamber base (12) having a discharge opening (13) therein, dosing chamber sidewalls (14) extending upwardly along the perimeter of said dosing chamber base (12) and at least one dosing chamber inlet opening (15) located proximal said dosing chamber sidewalls (14); at least one timer aperture (16) located proximal to said discharge opening (13); a plunger, provided in said dosing chamber (4) and moveable relative to said chamber so as to advance upon squeezing of said container (2), towards a blocking position; a valve retaining means (6) located below said dosing chamber base (12); a valve (7, 29, 33) provided in said valve retaining means (6) wherein said valve (7, 29, 33) is movable from an open position, allowing liquid flow through said discharge opening (13), and a closed position, where the valve blocks said discharge opening; and a nozzle; wherein the plunger can move from the dosing chamber base (12) to the blocking position, defining a travel distance; characterized in that the blocking position can be altered to provide a minimum travel distance, for delivering a minimum dose, which is from 5% to 66% of the maximum travel distance, for delivering the maximum dose.

The present invention further relates to the use claim of a dosing apparatus (1) according to any preceding claims to directly apply a dose of a hard surface cleaning composition onto a stain on a substrate.

BRIEF DESCRIPTION OF THE DRAWINGS

FIG. 3A is a cross-section taken along the line A-A of FIG. 1A of the dosing apparatus according to one embodiment of the present invention, wherein the dosing element top (35) is at an intermediate distance from the dosing chamber base (12), such that the plunger has an intermediate travel distance.

FIG. 3B is a cross-section taken along the line A-A of FIG. 1A of the dosing apparatus according to one embodiment of the present invention, wherein the dosing element top (35) is at its closest distance to the dosing chamber base (12). As such, the travel distance of the plunger is a minimum.

FIG. 10A is an axial cross-section of another embodiment of the dosing apparatus.

FIG. 10B is an exploded view of a dosing chamber and valve of the dosing apparatus according to the embodiment illustrated in FIG. 10A.

FIG. 11 is an axial cross-section of another embodiment of the dosing apparatus.

DETAILED DESCRIPTION OF THE INVENTION

Figure 1A:
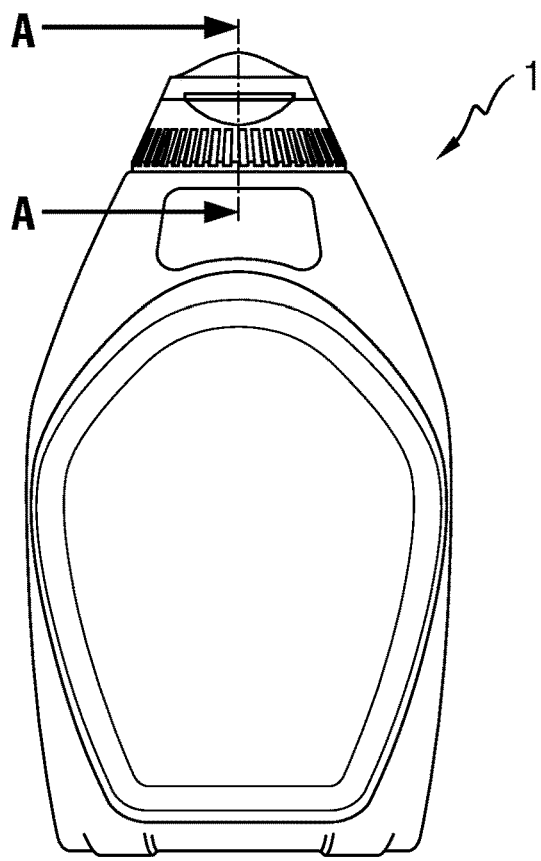
FIG. 1A is a front view of the dosing apparatus according to one embodiment of the present invention.

By the terms "a" and "an" when describing a particular element, we herein mean "at least one" of that particular element.

The term "dose" as used herein is defined as the measured amount of liquid to be delivered by the apparatus. The dose begins when the liquid first exits the nozzle and ends once the flow of said liquid stops. The volume of liquid dosed for each squeeze of the container is typically from 1 ml to 80 ml, preferably from 3 ml to 40 ml, more preferably 10 ml to 30 ml, and even more preferably 15 ml to 30 ml.

By "substantially independently from pressure" as used herein it is meant that pressure causes less than 10% variation from the target measured dose.

By "substantially constant liquid output or dosage" as used herein it is meant that variation from the target measured dose is less than 10%.

By "resiliently squeezable" as used herein it is meant that the container returns to its original shape without suffering any permanent deformation once pressure is released therefrom.

By "shear thinning" as used herein it is meant that the liquid referred to is non-Newtonian and preferably has a viscosity that changes with changes in shear rate.

By "ergonomic(s)" as used herein it is meant that the feature(s) is designed to maximize productivity by reducing operator (or user) fatigue and discomfort.

By "drip-free" as used herein it is meant that no visible residue is left proximal to the nozzle of the cap following dosing and/or that no liquid exits the resilient container when the apparatus is held top down without squeezing.

Various embodiments will now be described to provide an overall understanding of the principles of the structure, function, manufacture, and use of the apparatus and methods disclosed herein. One or more examples of these embodiments are illustrated in the accompanying drawings. Those of ordinary skill in the art will understand that features described or illustrated in connection with one example embodiment can be combined with the features of other example embodiments without generalization from the present disclosure.

A preferred field of use is that of dosage devices for domestic or household use, containing detergents such as hard surface cleaning compositions, liquid laundry detergent compositions, or other cleaning preparations, fabric conditioners and the like. Other fields of use include dosage devices for manual and automatic dishwashing liquids, hair-care products and oral care applications such as mouth washes, beverages (such as syrups, shots of liquors, alcohols, liquid coffee concentrates and the like), food applications (such as food pastes and liquid food ingredients), pesticides, and the like.

The resiliently squeezable container (2) can comprise a liquid therein, preferably a detergent composition. The liquid can be Newtonian or shear thinning. The viscosity of the liquid can be from 1 to 350 mPa·s, preferably from 1 to 300 mPa·s, more preferably from 1 to 250 mPa·s, even more preferably from 1 to 220 mPa·s, even more preferably 1 to 200 mPa·s and most preferably from 1 to 150 mPa·s (measured at 1000 s$^{-1}$ at 20° C.).

The invention is directed to an apparatus (1) for repeatedly dosing a quantity of liquid, in which the quantity of liquid dosed can be readily adjusted to suit the user's requirement. The apparatus (1) comprises a resiliently squeezable container (2), a cap (3) operably connected to said container (2), and a dosing chamber (4) operably connected to said cap (3). The dosing chamber (4) comprises a dosing chamber base (12) having a discharge opening (13) therein, dosing chamber sidewalls (14) extending upwardly along the perimeter of said dosing chamber base (12) and at least one dosing chamber one inlet opening (15) located proximal said dosing chamber sidewalls (14); There is at least one timer aperture (16) located proximal to said discharge opening (13). A plunger is provided in said dosing chamber (4) and is moveable relative to said chamber so as to advance upon squeezing of said container (2), up to a blocking position. A valve retaining means (6) is located below said dosing chamber base (12). A valve (7, 29, 33) provided in said valve retaining means (6) is movable from an open position, allowing liquid flow through said discharge opening (13), and a closed position, where the valve blocks said discharge opening. The dosing apparatus also comprises a nozzle. The apparatus (1) may have a longitudinal axis (YY) extending along/or substantially parallel to, the centerline of the apparatus (1). Said longitudinal axis (YY) may also be parallel to the direction of a portion of the fluid flow during dispensing.

In the present invention, the distance the plunger can move from the dosing chamber base (12) to the blocking position defines a travel distance and the blocking position can be altered to provide a minimum travel distance and a maximum travel distance, such that the minimum travel distance, for delivering the minimum dose, is from 5% to 66%, preferably from 10% to 50%, more preferably from 15% to 30% of the maximum travel distance, for delivering the maximum dose.

Accordingly, the dosing apparatus (1) can dispense a volume from the minimum dose setting which is from 5% to 66%, preferably from 10% to 50%, more preferably from 15% to 30% of the volume dispensed from the maximum dose setting.

For certain applications, such as dispensing liquid hard surface cleaning compositions, the "high" dose can be from 10 ml to 100 ml, preferably from 15 ml to 50 ml, more preferably from 20 ml to 30 ml. In contrast, the "low" dose can be from 0.1 ml to 5.0 ml, preferably from 0.2 ml to 2.5 ml, more preferably from 0.3 ml to 1.0 ml. For instance, it is desirable to dispense a large dose of liquid hard surface cleaning composition for dilution into a bucket of water, for example, for mopping of floors. In contrast, a smaller dose is desired for direct application on to a stain on a hard surface, before scrubbing.

For other applications, such as dispensing liquid laundry detergent compositions, the "high" dose can be from 20 ml to 150 ml, preferably from 25 ml to 120 ml, more preferably from 30 ml to 90 ml. In contrast, the "low" dose can be from 1 ml to 17.5 ml, preferably from 2.5 ml to 15 ml, more preferably from 5.0 ml to 10 ml. For instance, it is desirable to dispense a "high" dose of liquid laundry detergent composition into a washing machine, while a "low" dose is desired for direct application on to a fabric stain during pretreating.

The blocking position can be altered by any suitable means.

Figure 2:
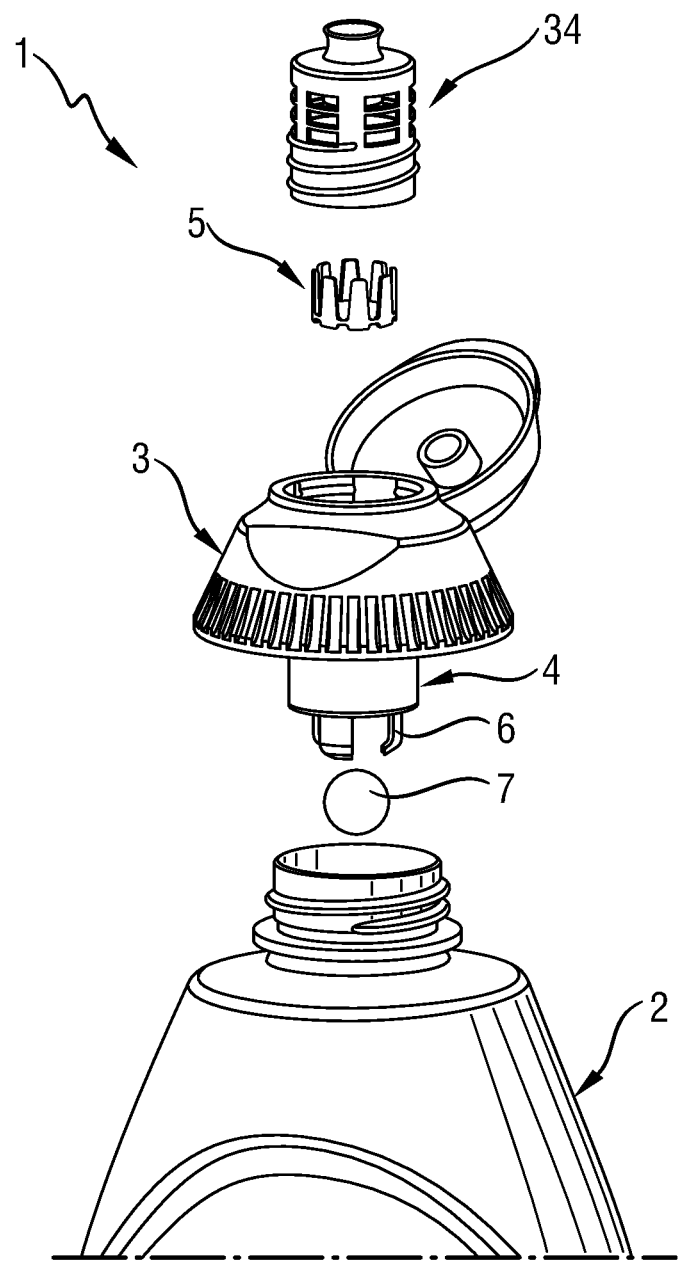
FIG. 2 is an exploded view of the dosing apparatus according to one embodiment of the present invention.

For instance, referring to FIG. 2, the dosing apparatus (1) can comprise a dosing element (34), wherein the dosing element comprises a dosing element top (35) which is positioned above the dosing chamber (4) and is moveable such that the blocking position can be altered. Such dosing elements (34) comprise the nozzle (8). The nozzle (8) comprises and/or defines an orifice (9) at its apex, and an entry tube (10) which extends downwardly and opposite said orifice (9).

Figure 5:
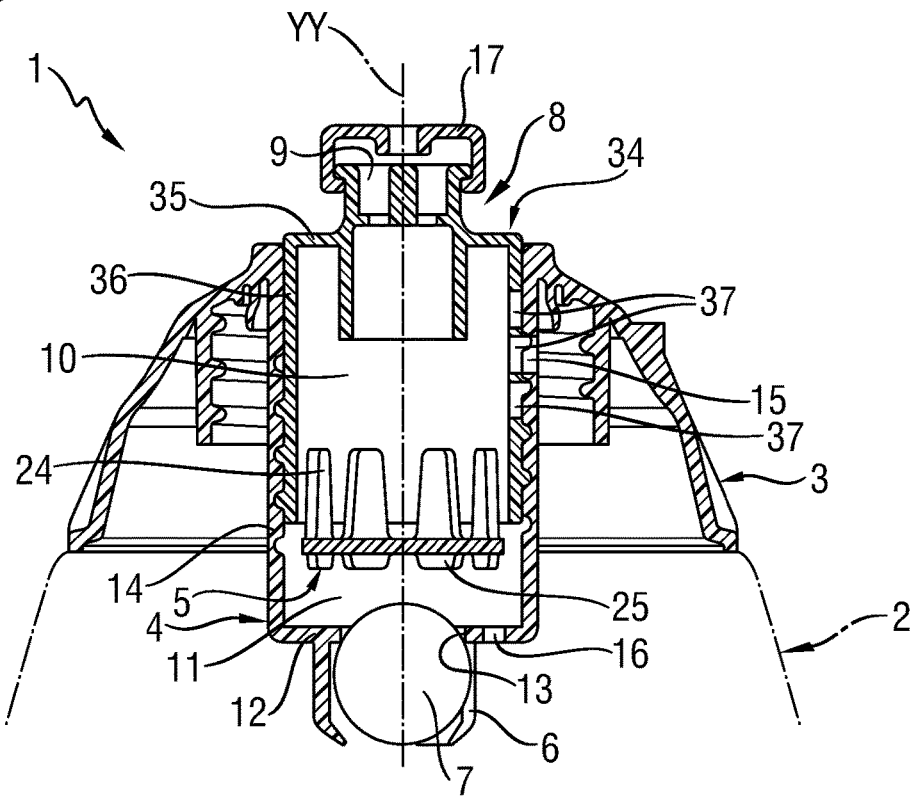
FIG. 5 is a cross-section taken along the line A-A of FIG. 1A of the dosing apparatus according to one embodiment of the present invention, wherein the nozzle comprises a push-pull closure.

Referring to FIG. 2 and FIG. 3, the dosing element top (35) comprises the nozzle (8) extending substantially parallel to the longitudinal axis (YY) preferably comprising and/or defining an orifice (9) at its apex, and an entry tube (10) which extends downwardly and opposite said orifice (9). Said orifice (9) can comprise a slit valve to reduce and even eliminate dripping. The entry tube (10) may extend vertically downwardly substantially parallel to the longitudinal axis (YY) so as to at least partly enter a volume formed by the dosing chamber (4). The cap (3) or dosing element top (35) may further comprise a top lid (17) capable of engaging with the nozzle (8) to provide a closing and sealing means. Preferably, the cap (3) comprises the top lid (17). Preferably, the top lid (17) may be pivotable upon a pivot point located on a surface of the cap (3). The person skilled in the art would understand that other closing features or cap constructions could also be used, such as a push-pull closure as exemplified in FIG. 5, or twist, screw or other caps know in the art.

The dosing chamber (4) comprises a dosing chamber base (12) having a discharge opening (13) located therein. Preferably, the discharge opening (13) is located at the centre of the dosing chamber base (12) to allow the liquid accumulated in the volume (11) of the dosing chamber (4) below the plunger to be quickly flushed back into the container (2) after squeezing. At least one timer aperture (16) is located proximal to the discharge opening (13). The dosing chamber (4) also has dosing chamber sidewalls (14) extending upwardly along the perimeter of the dosing chamber base (12) and have at least one dosing chamber one inlet opening (15) located proximal to said dosing chamber sidewalls (14). Preferably, the dosing chamber inlet openings (15) are located proximal to the apex of the dosing chamber sidewalls (14) opposite the dosing chamber base (12) of the dosing chamber (4). The dosing chamber base (12) of the dosing chamber (4) may be chamfered to form an inclined surface extending from the dosing chamber sidewalls (14) to the discharge opening (13). Preferably, said inclined surface extends substantially linearly from said dosing chamber sidewalls (14) to said discharge opening (13). Such configuration allows the liquid to drain from the dosing chamber (4) in an effective manner without leaving any left-behind residue, particularly in locations proximal to the dosing chamber sidewalls (14), which would otherwise cause jamming of the plunger upon drying.

Figure 7A:
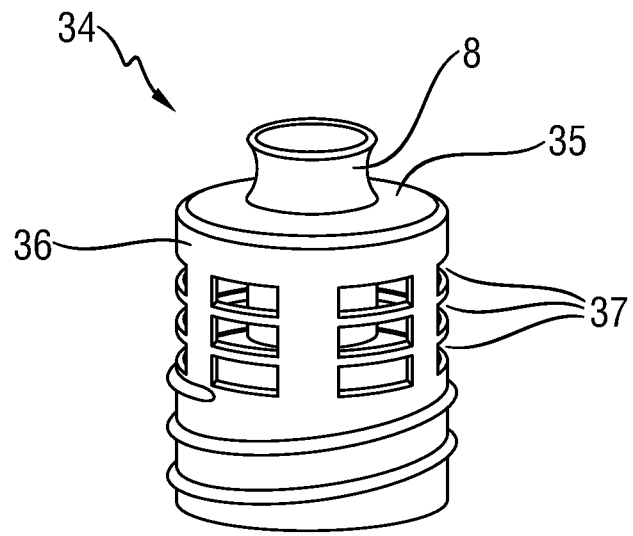
FIG. 7A is an isometric view of a dosing element (34) of the dosing apparatus according to a preferred embodiment of the present invention, viewed from above.
Figure 7B:
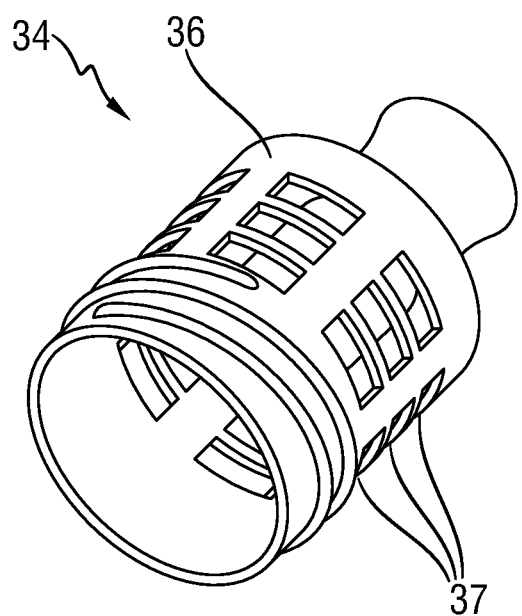
FIG. 7B is an isometric view of a dosing element (34) of the dosing apparatus according to a preferred embodiment of the present invention, viewed from below.

The dosing element (34) can further comprise dosing element sidewalls (36) extending downwardly along the perimeter of the dosing element top (35), with the entry tube (10) extending downwardly and opposite the orifice (9), and the dosing element sidewalls (36) contact the dosing chamber sidewalls (14). As such, the dosing element (34) is able to move within the dosing chamber (4), in order to vary the distance between the lowest point of the entry tube (10) and the dosing chamber base (12), as exemplified in FIG. 3A to 3C. Since the dose provided by the apparatus (1) varies with the distance that the plunger can move between the lowest point of the entry tube (10) and the dosing chamber base (12), the dose of liquid can be adjusted by altering the position of the dosing element (34), and hence the entry tube (10), relative to the dosing chamber base (12). The dosing element (34) can be moved relative to the dosing chamber base (12) by a sliding motion or rotational motion. For instance, the outer surface of the dosing element sidewalls (36) can comprise a ridge in the form of a screw-thread, whilst the inner surface of the dosing chamber sidewalls (14) can comprise the corresponding grooves for the screw thread, or vice-versa (see FIGS. 7A and 7B).

The dosing element sidewalls (36) can contact the dosing chamber sidewalls (14) over the circumference of the dosing element sidewalls (36), preferably such that liquid is not able to leak between the dosing element sidewalls (36) and dosing chamber sidewalls (14).

The dosing element sidewalls (36) can be irremovable from the dosing chamber sidewalls (14). This can be achieved using any suitable means, for instance, having a bead on the exterior face of the dosing element sidewalls (36), distal from the dosing element top (35), and the dosing chamber sidewalls (14) comprising a step or lip which abuts the bead when the dosing element (34) is at its furthest position from the dosing chamber base (12).

Figure 6A:
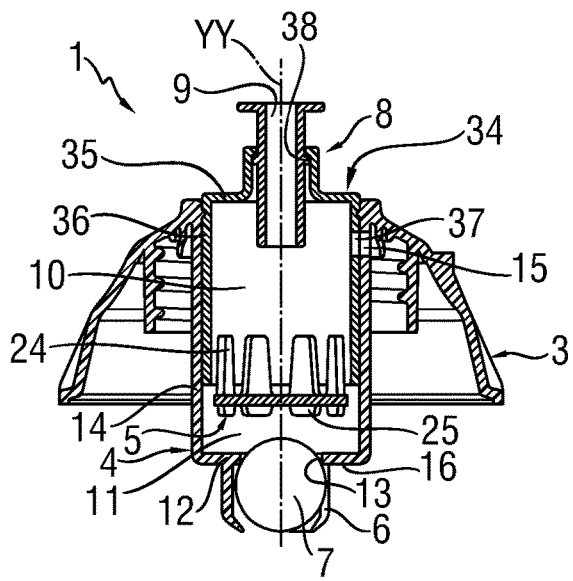
FIG. 6A is an axial cross-section of an embodiment of the present invention, wherein the nozzle (8) comprises an entry tube (10) which is moveable relative to the nozzle (8) such that the blocking position can be altered, in which the entry tube (10) is at its highest most position. As such, the travel distance of the plunger is a maximum.
Figure 6B:
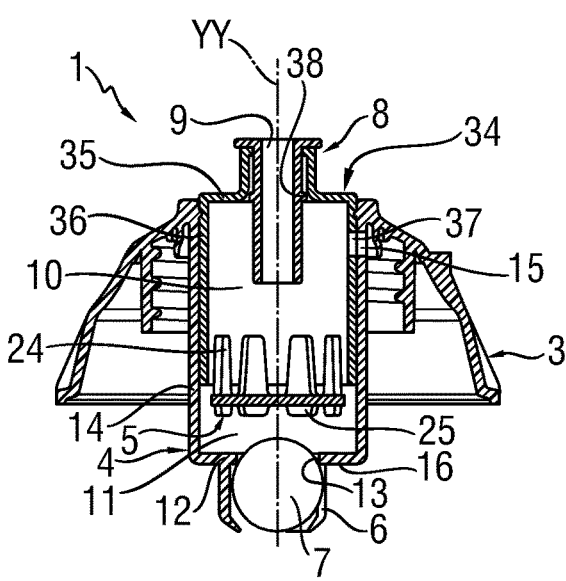
FIG. 6B is an axial cross-section of an embodiment of FIG. 6A, wherein the entry tube (10) is at its lowest most position. As such, the travel distance of the plunger is a minimum.

In order to vary the travel distance of the plunger, the nozzle (8) can comprise an entry tube (10), wherein the entry tube (10) is moveable relative to the nozzle (8) such that the blocking position can be altered (see FIGS. 6A and 6B). The entry tube (10) preferably contacts the nozzle (8) over the circumference of the entry tube (10), such that liquid is not able to leak between the entry tube (10) and the nozzle (8).

For instance the entry tube (10) is capable of displacing both upwardly and downwardly in a direction parallel to the longitudinal axis (YY) upon rotation of the cap (3). Changing the height of the entry tube (10) reduces the travel distance of the piston thus allowing the user to dose different quantities of liquid by simply rotating cap (3).

As such, the entry tube (10) of the dosing element (34) is able to move within nozzle (8), in order to vary the travel distance between the lowest point of the entry tube (10) and the dosing chamber base (12). Since the dose provided by the apparatus (1) varies with the distance that the plunger can move between the lowest point of the entry tube (10) and the dosing chamber base (12), the dose of liquid can be adjusted by altering the position of the dosing element (34), relative to the dosing chamber base (12). The entry tube (10) can be moved relative to the dosing chamber base (12) by a sliding motion or rotational motion. For instance, the outer surface of the entry tube (10) can comprise a ridge in the form of a screw-thread, whilst the inner surface of the nozzle (8) can comprise the corresponding grooves for the screw thread.

The entry tube (10) can be irremovable from the nozzle (10). This can be achieved using any suitable means. For instance, the entry tube (10) can comprise a bead (38) either at its extremity distal from the orifice (9) or positioned on the sidewall of the entry tube (10) (see FIGS. 6A and 6B). Hence, when the dosing element (34) is at its furthest position from the dosing chamber base (12), the bead (38) abuts the nozzle (10).

The nozzle (8) can be comprised on the cap (3). Alternatively, the nozzle (8) can be comprised on the dosing element ((34), particularly the dosing element top (35) as shown in FIG. 3A to 3C and FIGS. 6A and 6B.

The dosing element sidewalls (36) can comprise at least one dosing element inlet opening (37) located proximal said dosing chamber sidewalls (14). The at least one dosing element inlet opening (37) can at least partially overlap with the at least one dosing chamber inlet opening (15). For instance, when the dosing element (34) is rotatable, the dosing element (34), and hence the dosing element side walls (36) can be rotated such that the overlap between the at least one dosing element inlet opening (37) and the at least one dosing chamber inlet opening (15) can be altered. As such, the dosage provided by the dosing apparatus (1) can be further altered. When the dosing element (34) can be rotated such that there is no overlap between the at least one dosing element inlet opening (37) and the at least one dosing chamber inlet opening (15), the dosing apparatus (1) is closed. In addition, by rotating the rotatable element (34), the relative distance between at least one dosing element inlet opening (37) and the dosing chamber base (12) is also altered.

The ratio of the total cross-sectional open area of dosing chamber inlet openings (15) and the timer apertures (16) can be between 2 to 25, preferably from 2 to 24, preferably from 2 to 23, preferably from 4 to 22, preferably from 6 to 22, more preferably from 8 to 20, most preferably 10 to 18

The plunger is preferably in the form of a piston (5) and is moveable relative to the dosing chamber base (12) so as to advance upon squeezing of the inverted container (2). The piston (5) moves from a starting position—wherein the piston (5) is at its furthest position from the entry tube (10), up to a blocking position—wherein at least part of the piston (5) contacts the entry tube (10) so as to close it and terminating the dose. Preferably the motion of the piston (5) is linear and parallel to the longitudinal axis (YY), however, it is understood that any other kind of motion such as rotation and combination of rotation and translation may be equally suitable for generating a dose. Since the blocking position, typically the lowest point of the entry tube (10), can be altered, the distance that the plunger, preferably the piston (5), can traverse can be changed. Hence, the dose delivered by the apparatus can be altered.

The valve retaining means (6) is located below the dosing chamber base (12) of the dosing chamber (4) and may extend vertically downward from said dosing chamber base (12) in a direction substantially parallel to the longitudinal axis (YY). Preferably, the valve retaining means (6) is one part with the dosing chamber (4). This allows to reduce the number of parts required and contributes towards introducing benefits such as reduced manufacturing complexity and cost, and ease of assembly.

The valve (7) is preferably uni-directional (i.e. it opens and closes in one direction only) and is provided in the retaining means (6). The valve (7) is moveable from an open position—allowing liquid to flow through the discharge opening (13), and a closed position—wherein the valve blocks said discharge opening (13).

In a preferred embodiment, said valve (7) may be spherical in shape and may be capable of blocking the discharge opening (13) by at least partly entering the dosing chamber (4). Preferably, said valve may be capable of contacting and/or impacting and/or abutting at least part of the piston (5) when said piston (5) is in its starting position and said valve (7) is in its closed position upon squeezing of the resilient container (2). Such configuration allows easy and accurate location of the valve into the discharge opening upon squeezing of the container (2) with no need for a specific orientation to be maintained. Another advantage is that by allowing the valve (7) to at least partly enter the dosing chamber (4) and impact and/or abut at least part of the piston (5), said valve (7) acts as a precursor and pushes up the piston so as to overcome any initial jamming of said piston (5).

Figure 3C:
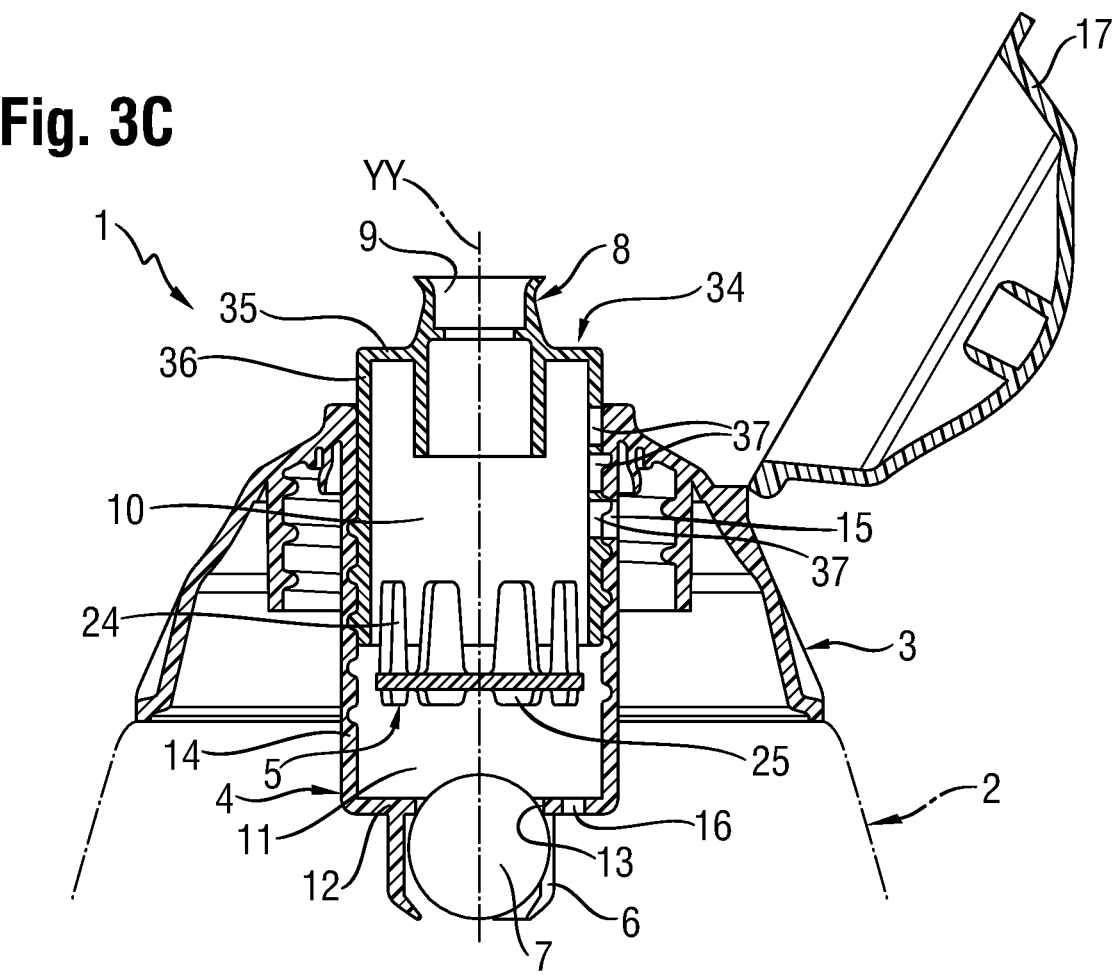
FIG. 3C is a cross-section taken along the line A-A of FIG. 1A of the dosing apparatus according to one embodiment of the present invention, wherein the dosing element top (35) is at the furthest distance to the dosing chamber base (12). As such, the travel distance of the plunger is a maximum.
Figure 4:
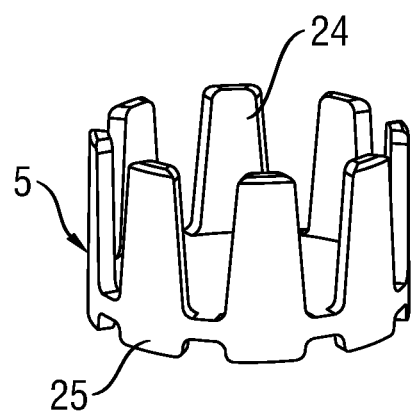
FIG. 4 is an isometric view of a piston of the dosing apparatus according to a preferred embodiment of the present invention.

In a preferred embodiment, as illustrated in both FIG. 3A to 3C, the piston (5) may have a substantially flat surface, preferably a flat surface, and may comprise stabilizing wings (24) extending upwardly and substantially parallel to the longitudinal axis (YY). Preferably, the root of said stabilizing wings (24) may be located along the circumference of said piston (5). Said stabilizing wings may be spaced apart so as to minimize material used and any friction with the dosing chamber sidewalls (14) and the dosing element side walls (36). The diameter of said piston (5) may be smaller than the diameter of said dosing chamber (4) to further reduce any friction effects between the surfaces thereof. Preferably, said piston (5) may further comprise protrusions (25) extending opposite and mirrored to said stabilizing wings (24) wherein said protrusions (25) are of smaller length than said stabilizing wings (24). Without being bound by theory, it is believed that an advantage of the flat configuration of the piston is that the pressure differential is minimized between the liquid flowing through the dosing chamber inlet openings (15) and the liquid flowing through the timer apertures (16), thus rendering the rate of climb of the piston (5) and consequently the dosage, dependent primarily on the ratio of the surface of the openings and the viscosity of the liquid. A further advantage is introduced by the protrusions (25), which reduce contact with the dosing chamber base (12) of the dosing chamber (4), thus minimizing jamming of the piston (5).

Figure 8:
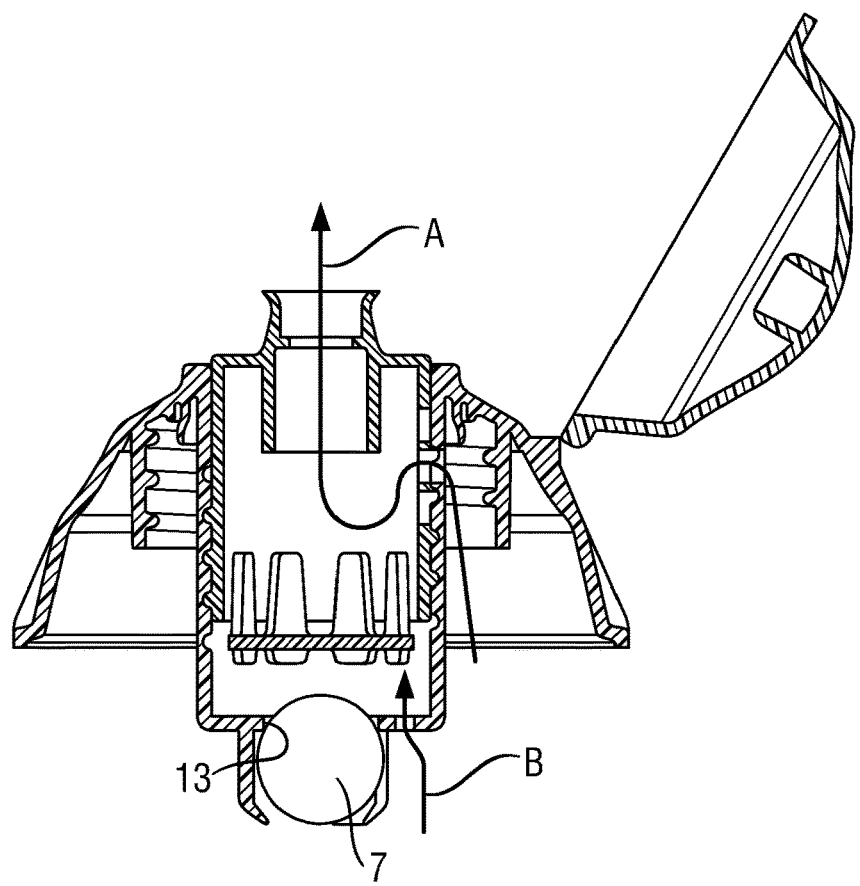
FIG. 8 is the embodiment of FIG. 3A, with the flow path of the liquid into the dosing chamber illustrated.

Referring to FIG. 8, when a force is applied to the inverted container (2), said container (2) experiences buckling and concurrently generates a pressure within said container (2) which causes the valve (7) to close the discharge opening (13). The liquid is consequently forced to flow into the dosing chamber (4) via the timer apertures (16) and the dosing chamber inlet openings (15). The flow path of the liquid is shown by arrows A and B of FIG. 8. The part of the liquid that flows through the timer apertures (16) pushes the piston (5) towards the entry tube (10), whilst the part of the liquid that flows through the inlet openings (15) is directly expelled from the container (5) through the entry tube (10) and out of the nozzle (8). Once the piston reaches the entry tube (10) liquid flow is stopped and the dose complete. Releasing the force from the inverted container (2) causes the resilient spring-back of the container surfaces and allows the vacuum, formed during squeezing and buckling of the container (2), to open the valve (7) and effectively drain the dosing chamber (4) while the piston returns to its starting position. At the same time the volume above the piston fills with air which is pulled in via the nozzle (8), venting the container (2) to bring the deformed container (2) back to its starting form. At this point a new dose may be dispensed by simply squeezing again said container (2) without needing to rotate the apparatus (1) back to the upright position.

Referring to FIG. 3A to 3C, in a preferred embodiment of the present invention the dosing chamber (4) may comprise dosing chamber sidewalls (14) extending vertically upwardly along the perimeter of dosing chamber base (12) and parallel to the longitudinal axis (YY). The dosing chamber (4) may be integrally molded to the cap (3). Alternatively, the dosing chamber (4) can be separately formed, for instance by injection molding, before being attached to the cap (3). In such embodiments, the dosing chamber sidewalls (14) and cap (3) can comprise corresponding protrusions and grooves, in order to "snap-fit" the dosing chamber (4) to the cap. Alternatively, the dosing chamber sidewalls (14) can comprise at least two tabs (18) extending vertically upwardly from the apex of said dosing chamber sidewalls (14) in a direction opposite to said dosing chamber base (12). The tabs (18) may be spaced apart so as to form a castellation on the upper portion of the dosing chamber (4). Such tabs (18) may define dosing chamber inlet openings (15) formed by the open space between said tabs (18). Preferably, the perimeter of said dosing chamber base (12) may be substantially circular, however it is understood by the person skilled in the art that other shapes may also be suitable such as oval, squared, triangular and so on. This configuration allows for ease of manufacture of the dosing chamber inlet openings (15). More preferably, the dosing chamber comprises multiple tabs (18) forming multiple dosing chamber inlet openings (15).

In one embodiment the tabs (18) may further comprise a notch which may follow the contour of the inside face of said tabs (18) and extend a predetermined length towards the longitudinal axis (YY), for compliance with a groove located on a surface of the cap (3). Preferably, said surface of cap (3) faces opposite to said longitudinal axis (YY) and is located on a first skirt (21). Said first skirt (21) may extend downwardly and substantially parallel to said longitudinal axis (YY) from a first surface of the cap (3) (see FIG. 8). The dosing chamber (4) may be connected to the cap (3) by snap fitting said tabs (18) to said first skirt. Such a construction allows for ease of assembly.

In a preferred embodiment the timer apertures (16) may be located in the dosing chamber base (12) of the dosing chamber (4). Preferably, said timer apertures (16) may be proximal to the discharge opening (13) and the centre line of said timer apertures (16) may be parallel to the centre line of said discharge opening (13). An advantage of such configuration is that laminar flow is maintained which serves to apply a constant and balanced force on the piston. Without wishing to be bound by theory, it is believed that turbulent flow may destabilize the smooth movement of the piston.

In a particularly preferred embodiment (not shown), the timer apertures (16) may be in the form of multiple slots extending for a predetermined length from the discharge opening (13) towards the dosing chamber sidewalls (14) through the dosing chamber base (12) of the dosing chamber (4). In this particular embodiment, the piston (5) comprises a ring-like protrusion extending from the base thereof in a direction substantially parallel to the longitudinal axis (YY) towards said dosing chamber base (12). The said ring-like protrusion may be capable of closing the multiple slots and the discharge opening (13) when in its starting position by being in relative contact with the corresponding surface of said dosing chamber base (12) of said dosing chamber (4). An advantage of this configuration is that bubbling through the timer apertures is significantly reduced and even prevented when the filled container is inverted without squeezing it. Without wishing to be bound by theory, it is believed that when holding the apparatus (1) in its inverted position, particularly when at an angle or when the liquid in the container has been partly depleted, air may flow through the timer holes causing a back pressure differential that results in some of the liquid to flow in the dosing chamber (4) through the dosing chamber inlet openings (15) and leak. Consistent dosing is therefore improved over different tilt angles and also at different container fill levels.

In further embodiments the timer apertures (16) may be located in and/or through the valve (29, 33), as illustrated in FIG. 10A to 10B and FIG. 11.

In a preferred embodiment, the dosing chamber base (12) of the dosing chamber (4) may be chamfered in such a way to define a first area and a second area. Preferably, said first area may be demarcated by the dosing chamber sidewalls (14) of the dosing chamber (4), and said second area may define the circumference of the discharge opening (13). More preferably, the said second area is located below said first area and the centerline of said first area coincides with the centerline of said second area.

Figure 9:
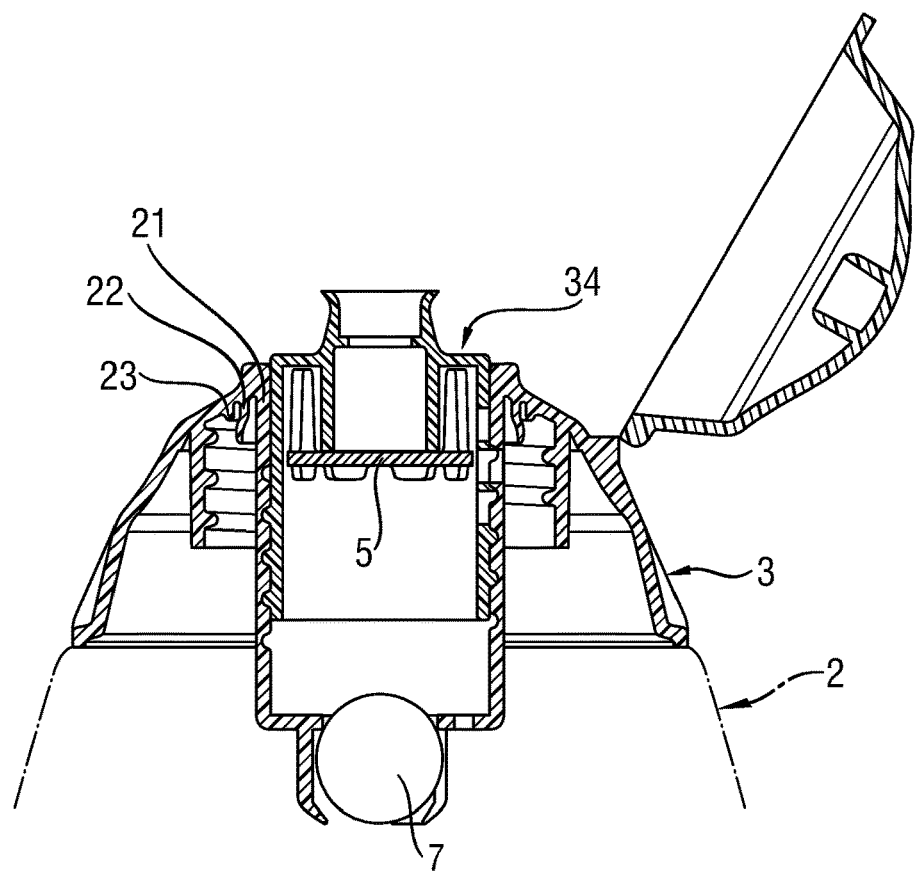
FIG. 9 is a cross-section taken along the line A-A of FIG. 1A of the dosing apparatus according to one embodiment of the present invention.

Referring to FIG. 9, in an embodiment of the present invention, the cap (3) may comprise a second skirt forming a plug seal (22) extending downwardly proximal to the first skirt (21), and a v-shaped notch (23) proximal to said second skirt (22). The plug-seal (22) and the V-shaped notch (23) may be capable of at least partly engaging with the uppermost surface of the container (2) so as to provide a secure sealing means and prevent leakage during dosage. An advantage of such a configuration is the reduction in the number of parts, since an additional sealing means such as an O-ring or the like is no longer required.

In an embodiment (not shown) of the present invention, the first skirt (21) may comprise shutter tabs in the form of spaced flanges or the like to at least partly cover at least one of the dosing chamber inlet openings (15). Alternatively, the first skirt (21) may have shutter tabs formed by portions of the first skirt (21) subtending at a variable vertical distance taken from a plane substantially parallel to the longitudinal axis (YY) to form a series of preferably linear gradients along the entire circumference of said first skirt (21). In this embodiment the first skirt (21) may be rotatable with respect to the dosage chamber (4) so as to allow more variation in the size of the dosing chamber inlet openings (15). This allows greater flexibility in dosage whereby the user can dispense different amounts of liquid by rotating the cap (3) which in turn changes the size of said inlet openings and thus the ratio of the surface of said dosing chamber inlet openings (15) and the timer apertures (16).

In a preferred embodiment of the present invention, as illustrated in FIG. 6, the valve retaining means (6) may be formed by at least three flexible hook-shaped protrusions (26) extending downwardly from said dosing chamber base (12) in a direction opposite to the dosing chamber sidewalls (14) of the dosing chamber (4) and substantially parallel to the longitudinal axis (YY). An advantage of such hook shaped protrusions (26) is the simplification of the de-molding operation during manufacturing by allowing pull-off from the injection mold without complex slides in the mold. A further advantage is that said hook shaped protrusions (26) allow to assemble the valve (7) easily via push-fit, while minimizing contact between said valve (7) and said hook shaped protrusions (26) which aids in preventing blockage.

In a further embodiment the retaining means (6) may further comprise at least one flat panel extending downwardly from said dosing chamber base (12) and substantially parallel to the longitudinal axis (YY). Said panels are preferably located in the gaps formed between the hook-shaped protrusions (26). This configuration allows to securely locate the valve (7) inside the retaining means (6) in a child-proof manner by preventing the removal of the valve (7) once inserted.

In a preferred embodiment (not shown) the valve retaining means (6) may be formed by at least two overhangs, preferably at least three overhangs, extending downwardly from said dosing chamber base (12) in a direction opposite to the dosing chamber sidewalls (14) of the dosing chamber (4) and substantially parallel to the longitudinal axis (YY). In this embodiment, a snap ring may join to the apex of said overhangs so as to define a valve insertion opening at the centre thereof. The snap ring may extend towards the centre of the valve insertion opening, and may be inclined at an angle from a plane perpendicular to said longitudinal axis (YY). Preferably, said angle is about 35° prior to the insertion of the valve through the valve insertion opening and deforms in a direction towards said dosing chamber base (12) when the valve is pushed through the valve insertion opening. The resulting angle of said snap ring after valve insertion is preferably −45° taken along said plane perpendicular to said longitudinal axis (YY). Preferably, said overhangs and said snap ring are one part with said dosing chamber (4). An advantage of this configuration is that potential entanglement of dosing chambers during the manufacturing procedure is avoided.

In another embodiment of the present invention, illustrated in FIG. 10A and FIG. 10B, the valve retaining means (6) may be formed by a projection (32) extending from said dosing chamber base (12) in a direction opposite to said dosing chamber sidewalls (14) and may engage with a flexible one-way disc valve (33) with a very low cracking pressure (i.e. low minimum upstream pressure at which the valve will operate). The valve (33) may be engaged to said valve retaining means (6) via a central snap fit or other means which allows movement of said valve (33) relative to said projection (32). The valve (33) may be substantially flat and circular in shape, although it is understood that other shapes may also be suitable such as dome shaped and/or umbrella shaped. The valve (33) may have timer apertures (16) extending therein. An advantage of such configuration is that the total size of the dosing chamber may be reduced together with reduced complexity in view of the simple central snap fit.

In an embodiment of the present invention, illustrated in FIG. 11, the valve (29) may be bullet shaped. Said bullet shape is defined by a substantially flat surface (30) on one end and a substantially convex surface (31) on the opposite end. The valve (29) may be inserted into the valve retaining means (6) via a snap fit or other means which allows movement of said valve (29) relative to said valve retaining means, the valve retaining means (6) guiding the valve (29) and preventing it from changing orientation. The flat surface of said valve may have an opening subtending more than 50% of the diameter of said valve (29) and the convex surface (31) may have one or more timer apertures (16) located proximal to the apex of said convex surface. The valve (29) may be oriented so that the convex surface (31) faces the discharge opening (13) and the flat surface (30) faces the inside of the container (2). An advantage of such configuration is ease of manufacture of the valve.

Figure 1B:
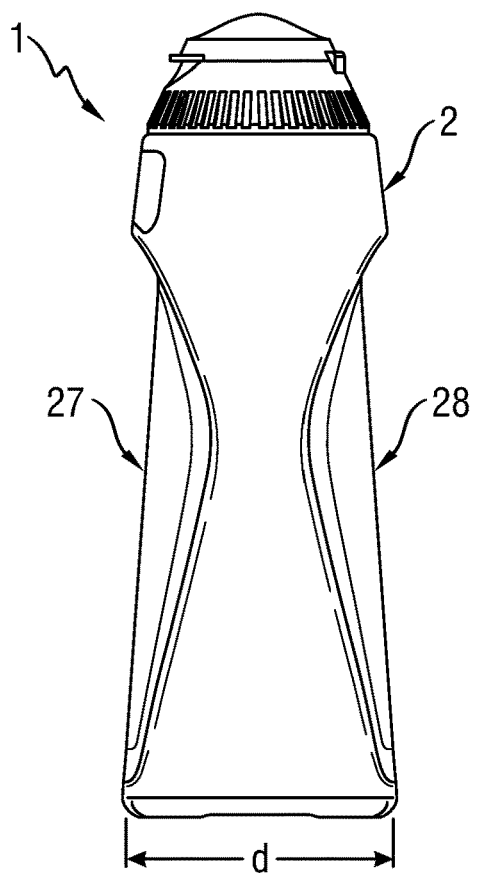
FIG. 1B is a side view of the dosing apparatus according to one embodiment of the present invention.

Referring to FIG. 1B, in a preferred embodiment the container (2) may comprise a front (27) and a back (28) surface in a facing relationship. Preferably, said front (27) and back (28) surfaces have a larger surface area compared to the other surfaces of the container (2) and are spaced apart so that the distance (d) between said front (27) and back (28) surfaces is between 30 mm to 100 mm. This specific range has been found to be optimal for allowing the user to correctly and comfortably grip the container and squeeze effectively.

The container (2) may be made of any flexible material, however, preferably said material is selected from the group consisting of PP, PET, PE or blends thereof. Said container (2) may be capable of displacing from 5 ml to 150 ml, preferably from 10 ml to 80 ml, of liquid without experiencing permanent deformation. Without being bound by theory it is believed that permanent deformation will create cracks in the container or cause paneling (i.e. the panels do not return to the starting position) which in turn reduce the displacement volume with each use, affecting the consistency of the dosage.

In a preferred embodiment (not shown), the container (2) may comprise an indicating means to indicate to the user the acceptable inclination angle of the apparatus (1) for effective dosage. Indeed, in some operations the user may need to angle the apparatus (1) due to space restrictions or simply comfort. However, tilting the apparatus (1) at too shallow angles may result in loss of accuracy of the dosage, particularly if air starts flowing through the dosing chamber inlet openings (15). This may be particularly true when the liquid is close to depletion. It may therefore be necessary to incline the apparatus (1) as much as possible but in such a way that the liquid still covers said dosing chamber inlet openings (15). An indicating means allowing the user to see when said liquid covers said dosing chamber inlet openings (15) may be desirable. Preferably, said indicating means is a transparent window located on said container (2) proximal to the connecting portion of the cap (3) with said container (2). Alternatively, said indicating means may be an entirely transparent container. A further advantage of such configuration is that the depletion of the liquid may be inspected by the user and the correct functioning of the valve and piston communicated.

The container (2) can comprise a front surface (27) and a back surface (28), wherein the distance between said front to said back surfaces is between 30 mm to 120 mm.

An advantage of the present invention is that constant dosage during use (i.e. as the liquid being dispensed is depleted from the container) is achieved whilst providing optimal ergonomics for the end user who can dispense a dose of liquid without experiencing strain during the squeeze operation, and allowing the dose size to be readily altered according to need. Indeed in a preferred embodiment, the dosing apparatus of the present invention consists of an ergonomic dosing apparatus.

In an preferred embodiment, the dosing apparatus delivers a dose of liquid at a pressure of less than 150 kPa, preferably less than 120 kPa, preferably less than or equal to 110 kPa, more preferably from 80 kPa to 110 kPa, even more preferably from 90 kPa to 100 kPa, measured according to the test method described herein. Without wishing to be bound by theory it is believed that higher pressures provide detriment to the ergonomics of the apparatus since the user is otherwise required to exert large forces over an extended squeeze time.

In an embodiment of the present invention, the dosage time is typically less than or equal to 3 s, preferably less than or equal to 2 s, preferably less than or equal to 1.5 s, preferably less than or equal to 1 s and more preferably less than or equal to 0.75 s but greater than 0 s, most preferably from 0.4 s to 0.75 s. Without wishing to be bound by theory it is believed that if the time of squeeze is too high, the user will apply a more variable squeezing force with the greatest force being applied towards the end of the squeeze resulting in the user experiencing an undesired fatigue especially in circumstances where multiple doses are required.

It has been found that the ratio of the total cross-sectional open area of the dosing chamber inlet openings (15) and the orifice (9) may also affect the dose, in particular if the total cross-sectional open area of the orifice is smaller than the total cross-sectional open area of the inlet openings. However, if the orifice (9) is too large, dripping may occur which would require the introduction of additional features to minimize said dripping such as silicone or thermoplastic elastomers (TPE) slit-seal valves and/or cross-shaped cuts in the orifice. Preferably, the ratio of the total cross-sectional open area of said dosing chamber inlet openings (15) and said orifice (9) may be from 4 to 0.25, preferably 1.

The ratio of the exposed cross-sectional area of the dosing chamber inlet openings (15) and the orifice (9) may be selected such that the speed of dosage is less than or equal to 1.5 s, preferably less than or equal to 1 s and more preferably less than or equal to 0.75 s, at ratios of total surface of the exposed cross-sectional area of the inlet openings (15): timer apertures (16) of from 15 to 25, preferably 18 to 25, more preferably 22 to 25.

In a preferred embodiment, the dose of liquid being expelled through the nozzle has a flow rate of greater than 20 g/s, preferably greater than 25 g/s, preferably greater or equal to 30 g/s, more preferably greater or equal to 35 g/s, more preferably greater or equal to 38 g/s, more preferably greater or equal to 40 g/s, even more preferably from 42 g/s to 70 g/s, even more preferably from 45 g/s to 65 g/s, most preferably from 50 g/s to 60 g/s, typically measured for the first 10 squeezes starting from a full container. By "full container" it is herein intended that the resilient container of the apparatus is filled with liquid as much as is normal in the field of detergent bottles, this is typically about 90% of the total inner volume of the container. Without wishing to be bound by theory it is believed that lower flow rates provide detriment to the ergonomic squeeze.

The viscosity and rheology profile of the liquid may impact the accuracy, speed of dosage, and comfort in the squeeze operation. It has been found that liquids having a shear thinning-type rheology profile and viscosity within the below-mentioned ranges ensure an acceptable force to be applied to the resilient container and thus permit an ergonomic squeeze of the container to provide a drip-free dose. In a preferred embodiment the liquids herein have a viscosity of from 1 to 350 mPa·s, preferably 1 to 300 mPa·s, more preferably from 1 to 250 mPa·s, even more preferably 1 to 220 mPa·s, measured at 1000 s$^{-1}$ at 20° C. The above viscosities will deliver a constant dose of liquid whilst permitting such ergonomic squeeze. If the viscosity of the liquid is above the mentioned ranges, an unacceptable amount of force is required to be applied by the user to complete a dose.

The viscosity measurements referred to herein are taken with an AR 1000 from TA instruments with a 2° 1' 5" cone angle spindle of 40 mm diameter with truncation of 57 micrometer. By "constant dose" it is herein meant that the variation in dose over multiple squeezes, typically 10 consecutive squeezes starting from a full container, does not exceed ±3 ml, preferably ±1 ml.

It has also been found that particularly shear thinning liquids provide for an optimal ergonomic squeeze of the resilient container thus providing good feel for the user upon dosing, this whilst also minimizing dripping. Without wishing to be bound by theory, it is believed that liquids having a viscosity of greater than 150 (and the below mentioned preferred ranges) at low shear (i.e. 10 s$^{-1}$ at 20° C.), in combination with the apparatus according to the present invention, provides a dose of liquid substantially drip-free but also provide the necessary feel and control to the user in the squeeze operation. At the same time, ensuring that the same liquid has a high shear viscosity (i.e. 1000 s$^{-1}$ at 20° C.) that is below the corresponding viscosity at low shear, preferably within the above mentioned cited ranges, ensures constant dosage with minimal effort whilst providing controlled squeezing. Therefore in a highly preferred embodiment the apparatus according to the present invention comprises a resilient container comprising a shear thinning liquid therein typically having a viscosity, at a shear rate of 10 s$^{-1}$ at 20° C., of more than 1 time, preferably at least 1.5 times, preferably 2 times, preferably from 2 to 100 times, more preferably from 3 to 50 times, even more preferably from 4 to 20 times, even more preferably from 5 to 15 times, most preferably from 6 to 10 times, greater than the viscosity at a shear rate of 1000 s$^{-1}$ at 20° C.

In a preferred embodiment, the low shear viscosity (i.e. at 10 s$^{-1}$ at 20° C.) is greater than 150 mPa·s, preferably greater than 200 mPa·s, more preferably greater than 250 mPa·s, even more preferably greater than 300 mPa·s. Viscosities below the above ranges result in undesirable dripping which not only provides unsightly residues being formed on the cap proximal to the orifice and messiness but also considerably affects consistency of the dosage.

Compositions suitable for use in the apparatus of the present invention are formulated as liquid compositions, preferably liquid detergent compositions, typically comprising water, preferably in an amount from 10% to 85% by weight of the total composition. Suitable compositions may be acidic or alkaline or both, and may further comprise abrasive cleaning particles, suspending aids, chelating agents, surfactants, radical scavengers, perfumes, surface modifying polymers, solvents, builders, buffers, bactericides, hydrotropes, colorants, stabilizers, bleaches, bleach activators, suds controlling agents like fatty acids, enzymes, soil suspenders, anti dusting agents, dispersants, pigments, thickeners, and/or dyes.

In a highly preferred embodiment the liquid compositions herein consist of a compact liquid. As used herein "compact" means a composition having densities in the range of from 0.5 to 1.5 grams, preferably from 0.8 to 1.3 grams, more preferably from 1 to 1.1 grams, per cubic centimeter, excluding any solid additives but including any bubbles, if present.

When a compact liquid is used, such has a shear thinning rheology profile to enable accurate and constant dispensing. In particular, the compact liquid typically has an undiluted viscosity "Vu" of from 1 to 350 mPa·s, preferably 1 to 300 mPa·s, more preferably from 1 to 250 mPa·s, even more preferably 1 to 220 mPa·s, at high shear (measured at 1000 s$^{-1}$ at 20° C.) and of greater than 150 mPa·s, preferably greater than 200 mPa·s, more preferably greater than 250 mPa·s, even more preferably greater than 300 mPa·s, even more preferably from 300 mPa·s to 15000 mPa·s, even more preferably from 300 mPa·s to 10000 mPa·s, most preferably from 300 mPa·s to 5000 mPa·s at low shear (measured at 10 s$^{-1}$ at 20° C.), and a diluted viscosity "Vd" that is less than or equal to 0.8 Vu, more preferably less than or equal to 0.5 Vu, even more preferably less than or equal to 0.3 Vu at the respective shear rate, typically measured at a low shear rate of 10 s$^{-1}$ at 20° C. The water that is used to prepare the aqueous solution for determining the diluted viscosity Vd of a composition is deionized water. The dilution procedure is described below. The advantage of such embodiment is that highly concentrated compositions may be formulated in the apparatus of the present invention whilst still achieving the desired consistency in drip-free dosage. Moreover, a compact liquid composition having the above diluted viscosity "Vd" is important to ensure high dissolution. Without wishing to be bound by theory, a compact liquid composition with high undiluted viscosity "Vu", important to ensure drip-free and constant dosing, will generally dissolve poorly, unless it is so formulated as to have a lower viscosity on dilution, as in the present highly preferred embodiment of the invention.

In a preferred embodiment, the liquid contained in the container consists of a liquid detergent composition comprising a rheology modifier comprising, preferably consisting of, polyacrylate based polymers, preferably hydrophobically modified polyacrylate polymers; hydroxyl ethyl cellulose, preferably hydrophobically modified hydroxyl ethyl cellulose, xanthan gum, hydrogenated castor oil (HCO) and mixtures thereof.

Preferred rheology modifiers are polyacrylate based polymers, preferably hydrophobically modified polyacrylate polymers. Preferably a water soluble copolymer based on main monomers acrylic acid, acrylic acid esters, vinyl acetate, methacrylic acid, acrylonitrile and mixtures thereof, more preferably copolymer is based on methacrylic acid and acrylic acid esters having appearance of milky, low viscous dispersion. Most preferred hydrologically modified polyacrylate polymer is Rheovis® AT 120, which is commercially available from BASF.

Other suitable rheology modifiers are hydroxethylcelluloses (HM-HEC) preferably hydrophobically modified hydroxyethylcellulose.

Suitable hydroxyethylcelluloses (HM-HEC) are commercially available from Aqualon/Hercules under the product name Polysurf 76® and W301 from 3V Sigma.

Xanthan gum is one suitable rheology modifier for liquids used herein. Xanthan gum is produced by fermentation of glucose or sucroce by the *Xanthomonas campestris* bacterium. Suitable Xanthan gum is commercially available under trade anem Kelzan T® from CP Kelco.

Hydrogenated castor oil is one suitable rheology modifier used herein. Suitable hydrogenated castor oil is available under trade name TIXCIN R from Elementis.

The most preferred rheology modifier used herein is hydrologically modified polyacrylate polymer Rheovis® AT 120, which is commercially available from BASF.

Typically, the thickened liquid hard surface cleaning composition herein comprises from 0.1% to 10.0% by weight of the total composition of said thickener, preferably from 0.2% to 5.0%, more preferably from 0.2% to 2.5% and most preferably from 0.2% to 2.0%.

Method of Use

Figure 12A:
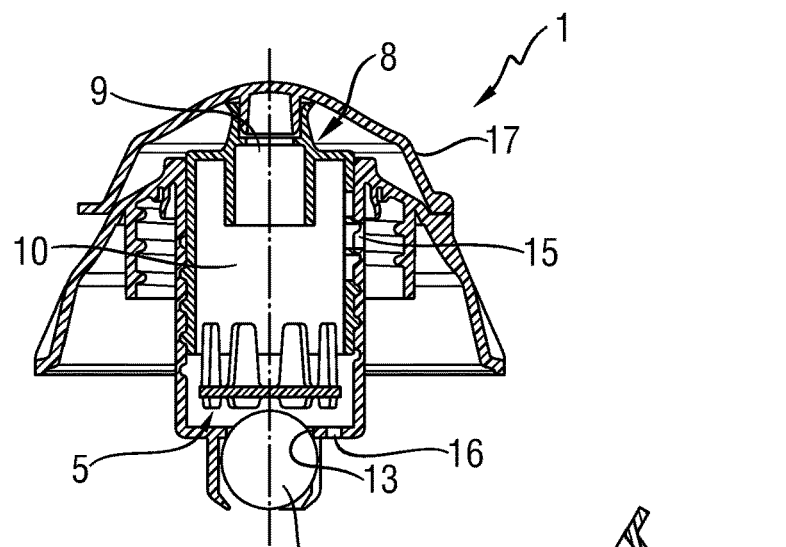
FIG. 12A to 12C are axial cross-sections of an embodiment of the present invention illustrating the positioning of the piston and valve in the various phases of dispensing.
Figure 12B:
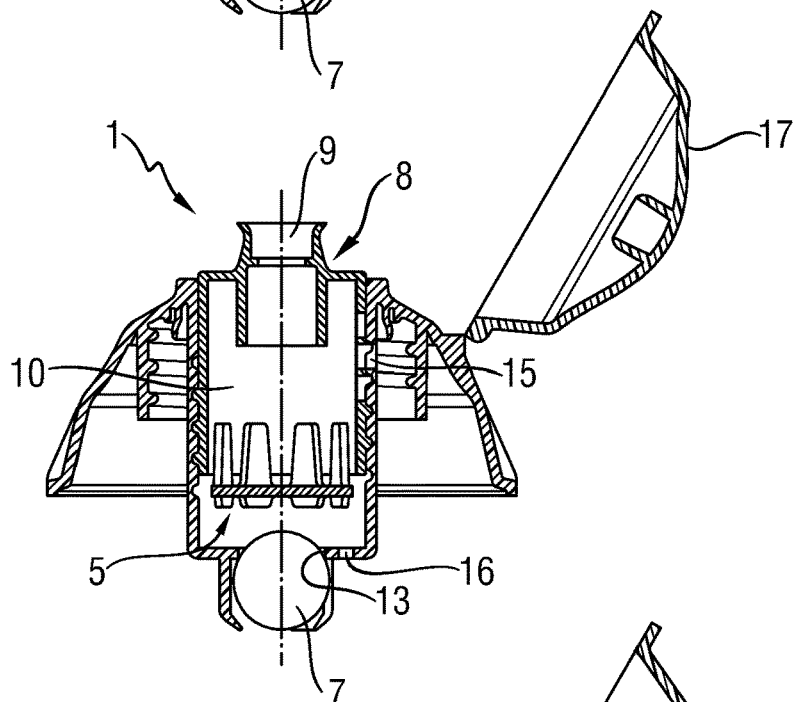
Figure 12C:
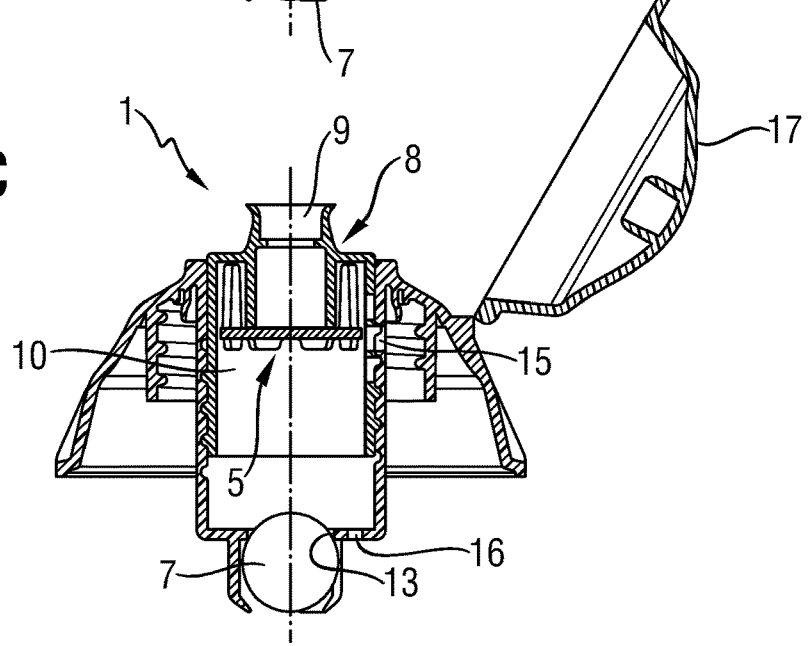

FIG. 12A to 12C illustrate an example of the operation of apparatus (1). FIG. 10A illustrates the resting position of apparatus (1), prior to use. The user disengages the top lid (17) or opens the orifice (9) and inclines the apparatus (1) top down, in a substantially inverted position. The user then squeezes the container (2) preferably with one hand to begin the dosage. The liquid flow causes the valve (7) to close the discharge opening (13) and the liquid to flow through the timer apertures (16) causes the piston (5) to move towards the entry tube (10). Concurrently the liquid forced through the dosing chamber inlet openings (15) is discharged through the entry tube (10) and out of the nozzle (8). FIG. 12B shows the apparatus (1) in its dosing arrangement with the piston (5) at its mid position. The user may squeeze said container for no more than 1.5 seconds, preferably no more than one second, to complete the dose. The volume of liquid dosed for each squeeze of the container (2) may be from 1 ml to 80 ml, preferably from 3 ml to 40 ml, more preferably 10 ml to 30 ml, and even more preferably 10 ml to 25 ml. FIG. 12C illustrates the arrangement of apparatus (1) at the end of the dosage. Once the piston (5) reaches the entry tube (10) so as to close it, the dose is complete and the user may release the force from said container (2). The valve is then opened by the pressure differential generated as the resilient container (2) deforms back to its original shape, and the liquid is discharged into the container (2) through the discharge opening (13) allowing the piston (5) to return to its starting position. The user may now re-squeeze said container (2) to dispense a new dose, without the need of re-inverting the apparatus (1). This process may be repeated for all subsequent dosages as necessary.

Viscosity Measurements—

The viscosity of liquid compositions herein, including Vu and Vd, is measured using an AR 1000 from TA Instruments with a 2° 1' 5" cone angle spindle of 40 mm diameter with truncation of 57 micrometer, shear rate factor of 28.6, and shear stress factor of 0.0597. The software used is the TA Instruments software, version 3.03 or higher. The following settings are used: a pre-shear with a shear rate of 10 s$^{-1}$ for 10 seconds with 1 minute equilibration and a shear rate continuous ramp of from 0.1 s$^{-1}$ till 1200 s$^{-1}$, during 3 minutes with 32 points per decade. All measurements are carried out at room temperature at 20° C.

Dilution of Compact Liquid Composition—

The compact liquid composition is diluted with deionized water according to the following protocol. 100 g of composition are weighed in a plastic beaker. The beaker is stirred with a mechanical stirrer rotating at low speed 200 rpm to avoid entrapment of air into the product. While stirring, 50 ml of deionized water are added to the composition. The composition is stirred for 4 minutes, until the composition is fully homogeneous. The composition is allowed to rest for 15 minutes before starting the viscosity measurement. The entire procedure is carried out at room temperature at 20° C.

Pressure Measurements—

A pressure sensor of the type MSR145 IP67 waterproof mini data logger from MSR Electronics GmbH (frequency of ⅒s, pressure range 0-2000 mBar±2.5 mBar) is inserted into a container according to the present invention filled with a liquid according to the present invention. The cap and the remaining components of the apparatus according to the present invention are then fitted to close the container. Repeated doses of liquid are prepared by repeated squeezes of the apparatus in top down vertical orientation, typically 10 consecutive squeezes starting from a full container. The squeezing is carried out by a robot with a two point squeeze and having a Festo sfc-dc-vc-3-e-h2-co control box and Festo hgple-25-40-2.8-dc-vcsc-g85 motor, that is set to compress the container at a speed "v" of 20 mm/s and acceleration "a" of 100 mm/s$^2$, and using the below protocol (typically the relative distance "xt" is 32 mm for containers holding 400 ml, 33 mm for 520 ml containers, 27.5 mm for 600 ml containers and 21 mm for 946 ml containers). Pressure readings are recorded by the sensor. Such measurements are repeated for apparatuses having a wide range of inlet and timer aperture ratios and for a range of viscosities.

Determining Acceptable Squeeze Ergonomics—

Acceptable squeeze ergonomics is determined via testing a number of apparatuses according to the present invention with an expert panel. Panelists are asked to rate a number of different apparatuses in terms of comfort and easiness of squeeze to generate a complete dose of liquid. Panelists are asked to squeeze apparatuses having different inlet and timer aperture ratios and different viscosity profiles. The results are recorded.

Flow Rate Measurements—

A pressure sensor of the type MSR145 IP67 waterproof mini data logger from MSR Electronics GmbH (frequency of 1/10 s, pressure range 0-2000 mBar±2.5 mBar) is inserted into a container according to the present invention filled with a liquid according to the present invention. The cap and the remaining components of the apparatus according to the present invention are then fitted to close the container. Repeated doses of liquid are prepared by repeated squeezes of the apparatus in top down vertical orientation, typically 10 consecutive squeezes starting from a full container. The squeezing is carried out by a robot with a two point squeeze and having a Festo sfc-dc-vc-3-e-h2-co control box and Festo hgple-25-40-2.8-dc-vcsc-g85 motor, that is set to compress the container at a speed "v" of 20 mm/s and acceleration "a" of 100 mm/s$^2$ and using the below protocol (typically the relative distance "xt" is 32 mm for containers holding 400 ml, 33 mm for 520 ml containers, 27.5 mm for 600 ml containers and 21 mm for 946 ml containers). Pressure readings are recorded by the sensor. Such measurements are repeated for apparatuses having a wide range of inlet and timer aperture ratios and for a range of viscosities. The weight of each dose and the time to deliver the dose is recorded. The time is recorded with a high speed camera at 300 frames/second. The flow rate for each dose is calculated by dividing the mass of the dose delivered by the time taken to complete the dose.

Protocol for Robot Squeeze—

The apparatus to be tested is mounted upright in the robot arm. The settings for speed and acceleration are adjusted to the above mentioned parameters. The apparatus is turned top down and then squeezed until the dose is complete. The apparatus is turned upright and then the squeeze is released. Pressure, mass and time parameters are recorded as explained above. The process is repeated, typically 10 times for each condition and readings recorded each time.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dosing apparatus for dispensing a dose of liquid comprising:
   (i) a resiliently squeezable container;
   (ii) a cap operably connected to said container;
   (iii) a dosing chamber integrally molded to said cap, wherein said dosing chamber comprises a dosing chamber base having a discharge opening therein, dosing chamber sidewalls extending upwardly along the perimeter of said dosing chamber base and at least one dosing chamber inlet opening located proximal said dosing chamber sidewalls;
   (iv) at least one timer aperture located proximal to said discharge opening;
   (v) a plunger, provided in said dosing chamber and moveable relative to said chamber so as to advance upon squeezing of said container, towards a blocking position;
   (v) a valve retaining means located below said dosing chamber base;
   (vi) a valve provided in said valve retaining mean wherein said valve is movable from an open position, allowing liquid flow through said discharge opening, and a closed position, where said valve blocks said discharge opening; and
   (vii) a nozzle;
   wherein the plunger can move from the dosing chamber base to the blocking position, defining a travel distance;
   characterized in that said blocking position can be altered to provide a minimum travel distance, for delivering a minimum dose, wherein said minimum travel distance is from 5% to 66% of the travel distance, for delivering the maximum dose;
   wherein the dosing apparatus further comprises:
   (viii) a dosing element, wherein the dosing element comprises a dosing element top which is positioned above the dosing chamber and wherein at least part of the dosing element top is moveable such that the blocking position can be altered; and
   said dosing element comprises the nozzle, the nozzle comprising and/or defining an orifice at its apex, and an entry tube;
   wherein dosing element top defines a perimeter and the dosing element further comprises dosing element sidewalls extending downwardly along the perimeter of the dosing element top, and the entry tube extends downwardly and opposite said orifice, and the dosing element sidewalls contact the dosing chamber sidewalls;
   wherein said dosing element top can be moved relative to the dosing chamber base by a rotational motion; and
   wherein a screw thread and a groove connect said outer surface of said dosing element sidewalls and said inner surface of said dosing chamber sidewalls.

2. The dosing apparatus according to claim 1, wherein the volume dispensed from the minimum dose setting is from 5% to 90% of the volume dispensed from the maximum dose setting.

3. The dosing apparatus according to claim 2, wherein the volume dispensed from the minimum dose setting is from 10% to 50% of the volume dispensed from the maximum dose setting.

4. The dosing apparatus according to claim 3, wherein the volume dispensed from the minimum dose setting is from 15% to 30% of the volume dispensed from the maximum dose setting.

5. The dosing apparatus according to claim 1 wherein said dose can be varied from 1 ml to 80 ml.

6. The dosing apparatus according to claim 5 wherein said dose can be varied from 3 ml to 40 ml.

7. The dosing apparatus according to claim 6 wherein said dose can be varied from 10 ml to 30 ml.

8. The dosing apparatus according to claim 1 wherein the blocking position is moveable with respect to the dosing chamber base to set said travel distance.

9. The dosing apparatus according to claim 1, wherein the dosing element sidewalls comprises at least one dosing element inlet opening located proximal said dosing chamber sidewalls.

10. The dosing apparatus according to claim 1, wherein the nozzle comprises an entry tube, wherein the entry tube is moveable relative to the nozzle such that the blocking position can be altered.

11. The dosing apparatus according to claim 10, wherein the entry tube is irremovable from the nozzle.

12. The dosing apparatus according to claim 1, wherein the resiliently squeezable container contains a liquid having a viscosity of from 1 to 350 mPa·s, when measured at 1000 $s^{-1}$ at 20° C.

13. The dosing apparatus according to claim 12, wherein the resiliently squeezable container contains a liquid having a viscosity of from 1 to 220 mPa·s, when measured at 1000 $s^{-1}$ at 20° C.

14. The dosing apparatus according to claim 13, wherein the resiliently squeezable container contains a liquid having a viscosity of from 1 to 150 mPa·s, when measured at 1000 $s^{-1}$ at 20° C.

15. The dosing apparatus according to claim 1 wherein said container comprises a front surface and a back surface, and wherein the distance between said front to said back surfaces is between 30 mm to 120 mm.

16. A method of treating a stain on a substrate, comprising the step of to directly applying a dose of a hard surface cleaning composition onto the stain using a dosing apparatus according to claim 1.

* * * * *